(12) United States Patent
Larsson

(10) Patent No.: US 6,798,765 B2
(45) Date of Patent: *Sep. 28, 2004

(54) METHOD FOR FORWARDING IN MULTI-HOP NETWORKS

(75) Inventor: Peter Larsson, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 464 days.

This patent is subject to a terminal disclaimer.

(21) Appl. No.: 09/970,023

(22) Filed: Oct. 4, 2001

(65) Prior Publication Data

US 2002/0051425 A1 May 2, 2002

Related U.S. Application Data

(63) Continuation-in-part of application No. 09/697,352, filed on Oct. 27, 2000.

(51) Int. Cl.$^7$ .............................................. H04L 12/28
(52) U.S. Cl. ....................................... 370/351; 370/400
(58) Field of Search ................................. 370/254, 256, 370/351, 389, 392, 400, 401, 428

(56) References Cited

U.S. PATENT DOCUMENTS

| | | | | |
|---|---|---|---|---|
| 5,949,760 A | * | 9/1999 | Stevens et al. ............. | 370/254 |
| 5,963,559 A | * | 10/1999 | Ohki .......................... | 370/445 |
| 6,097,703 A | * | 8/2000 | Larsen et al. ............... | 370/254 |
| 6,625,773 B1 | * | 9/2003 | Boivie et al. ............... | 714/749 |
| 6,633,574 B1 | * | 10/2003 | Koch et al. ................. | 370/410 |

FOREIGN PATENT DOCUMENTS

| | | |
|---|---|---|
| WO | WO 95 11561 | 10/1994 |
| WO | WO 98 56140 | 6/1998 |

OTHER PUBLICATIONS

Corson S et al: "A Distributed Routing Algorithm for Mobile Radio Networks", Proceedings of the military communications conference, US, New York, IEEE, Oct. 15, 1989.

* cited by examiner

*Primary Examiner*—Chau Nguyen
*Assistant Examiner*—Blanche Wong

(57) ABSTRACT

A system and method for forwarding information in a multi-hop network. An originating node broadcasts or multicasts a probe message to a plurality of other network nodes, including at least one candidate relay node, in a general direction in which the information is to be forwarded. Each candidate relay node that successfully receives the probe message returns an acknowledgment to the originating node, which then selects one of the acknowledging nodes. The originating node then transmits the information to the selected relay node, which returns an acknowledgment when the information is received. The selected relay node is then designated as the originating node, and the process is repeated to propagate the information through the network. If the acknowledgment of the data is not received, the originating node may select a different one of the candidate relay nodes that acknowledged the probe message, or may repeat the selection process.

38 Claims, 8 Drawing Sheets

METHOD FOR FORWARDING IN MULTI-HOP NETWORKS

This Application is a Continuation-in-Part of application Ser. No. 09/697,352, filed in the U.S. patent and Trademark Office on Oct. 27, 2000.

BACKGROUND OF THE INVENTION

1. Field of the Invention

The present invention relates generally to the field of forwarding information through multi-hop networks.

2. Description of Related Art

In a multihop communications approach, information is transmitted in multiple hops or segments between a source and a destination instead of directly (e.g., 1-hop). This approach can offer advantages such as lower power consumption and greater information throughput.

Bellman Ford and associated prior art routing techniques build up and define a multihop route from a source to a destination. This is done by passing routing cost information around to form a routing table. The cost information can include, for example, message delays, cumulative power consumption, and hop count. This information can be entered or summarized in the routing table. Within the system, each node or station uses the routing table to make independent decisions. Bellman Ford (also called "distance vector") based routing leads to existence of a single route for each source-destination pair. However, as topology changes due to mobility, this single route (per source-destination pair) will pass different nodes over time.

Changes or fluctuations within the system imply that optimal routing can change based on current conditions in the system. In other words, fluctuation of system properties or characteristics over time, can create windows or peaks of opportunity that enable signal transmissions to be more successful than at other times and conditions. System properties subject to change can include, for example, path quality, noise, interference, and message traffic load. The prior art routing techniques such as Bellman Ford, do not recognize these windows of opportunity, because the stations in the system do not each store relative information.

In contrast, opportune routing techniques exploit opportunities that fluctuation provides. In the context of wireless routing in particular, overall system performance suffers when quality of links within the system varies rapidly over time (for example, due to Rayleigh fading). However, opportune routing partially offsets this loss of performance by using the windows or peaks of opportunity that the variation also provides. When opportune routing is employed, there is not a single route for each source-destination pair. Instead, data packets follow a route that is somewhat random, leading from the source to the destination. Consequently, when Bellman Ford is used, consecutive packets in Bellman Ford will be sent over the same route (provided topology of the network does not change in the meantime), whereas when opportune routing is used, consecutive packets may be routed over different paths but in the same direction.

U.S. Pat. No. 6,097,703, and also PCT International Application PCT/GB98/01651, published on Dec. 10, 1998 with International Publication Number WO 98/56140, describe an opportune routing system wherein each station in a network, monitors the activity of other stations in the network. Each station decides, independently and opportunistically, and at the time of transmission, which of the other stations it will use to relay a message. For example, a first station selects one of several candidate stations, and then forwards the message to the selected candidate. If this transmission is successful, then the selected candidate in turn selects one of several candidate stations, and the cycle repeats. If the transmission from the first station to the first selected candidate station is unsuccessful, then the first station sends the message to another of the candidate stations. If none of the candidate stations successfully receives the message, then the first station tells the previous station that it cannot forward data. In this situation the previous station will attempt to forward the data via another of its own candidate stations. Thus the cycles repeat, and the message either advances or falls back, depending on how the candidate stations respond.

In summary, disclosed opportune routing techniques appear to simply be faster forwarding algorithms put on top of a traditional, pro-active routing information protocol that itself is inherently slow. For example, in the text *Routing in Communication Networks*, edited by Martha E. Stenstrup, copyright Prentice Hall 1995, on page 388 it is stated that "An approach that avoids this problem uses multiple routing algorithms, working at different timescales: fast algorithms which work with local information but which produce suboptimal routes, and slower algorithms which use more global information to generate better routes." And on page 353, "The need for rapid response means that multiple algorithms working at different timescales are required (fast algorithms that work with local information, and longer-term algorithms that use more global information)."

By way of further example, general monitoring disclosed in U.S. Pat. No. 6,097,703 and International Publication Number WO 98/56140 is a slow process. Monitoring is either handled by listening in on messages passing by, or by actively sending out probes. When a probe is sent out, a response is expected back that includes information, for example regarding path loss. When there is a delay between the return of a probe and a data transmission, then the information provided by the return of the probe may become obsolete by the time the data is transmitted. One undesirable consequence is that existing opportune routing techniques, and also Bellman Ford based routing techniques, do not handle possible diversity effects gracefully. Accordingly, better techniques are needed that perform quickly and handle diversity effects gracefully and effectively.

SUMMARY OF THE INVENTION

In accordance with exemplary embodiments of the invention, in order to transmit a data message in a multi-hop environment, a first station broadcasts or multicasts a transmission to other stations or receivers nearby. After one or more of the stations replies to the first station, the first station selects one of the stations that replied and transmits a command message to the selected station to assume responsibility for forwarding the data message. The data message can accompany the first transmission from the first station, or can accompany the command message. In addition, the replies to the first station can include information regarding costs of routing the data message to its destination.

In another variation, the first transmission can include both the data message and a command message designating one of the nearby stations, so that when the designated station receives the first transmission it can immediately forward the data message and then later reply to the first station. If the designated station does not reply to the first station within a time interval, then other stations that also received the data message can reply to the first station, and the first station can select and command one of them to forward the data message.

Both branch diversity and the capture effect can be used to enhance the data forwarding process. In particular, branch diversity provided by the broadcast/multicast reduces the need to use interleaved data together with coding to combat fading channels, and this in turn means less delay and therefore higher data throughput. The capture effect refers to a phenomenon wherein only the stronger of two signals that are at or near the same frequency, is demodulated, and the weaker signal is completely suppressed and rejected as noise. In conjunction with multiple receiving nodes or stations, the capture effect provides a high degree of robustness when data transmissions collide by maximizing the probability that at least one of the nodes will successfully receive the desired transmission. Exemplary embodiments of the invention are particularly effective when the data message or data information are larger than the signaling data.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

In accordance with exemplary embodiments of the invention, in order to transmit a data message in a multi-hop environment, a first station broadcasts or multicasts a transmission to other stations or receivers nearby. This can be done, for example, by sending directly without a sensing channel, or by using techniques known in the art such as CSMA (Carrier Sense Multiple Access) or CSMA/CA (CSMA with Collision Avoidance), and so forth. After one or more of the stations replies to the first station, the first station selects one of the stations that replied and transmits a command message to the selected station to assume responsibility for forwarding the message. The data message can accompany the first transmission from the first station, or can accompany the command message. In addition, the replies to the first station can include information regarding costs of routing the data message to its destination.

Both branch diversity and the capture effect can be used to enhance the data forwarding process. In particular, branch diversity provided by the broadcast/multicast reduces the need to use interleaved data together with coding to combat fading channels, and this in turn means less delay and therefore higher data throughput. The capture effect refers to a phenomenon wherein only the stronger of two signals that are at or near the same frequency, is demodulated, and the weaker signal is completely suppressed and rejected as noise. In conjunction with multiple receiving nodes or stations, the capture effect provides a high degree of robustness when data transmissions collide by maximizing the probability that at least one of the nodes will successfully the desired transmission. Exemplary embodiments of the invention are particularly effective when the data message or data information are larger than the signaling data.

Figure 1:
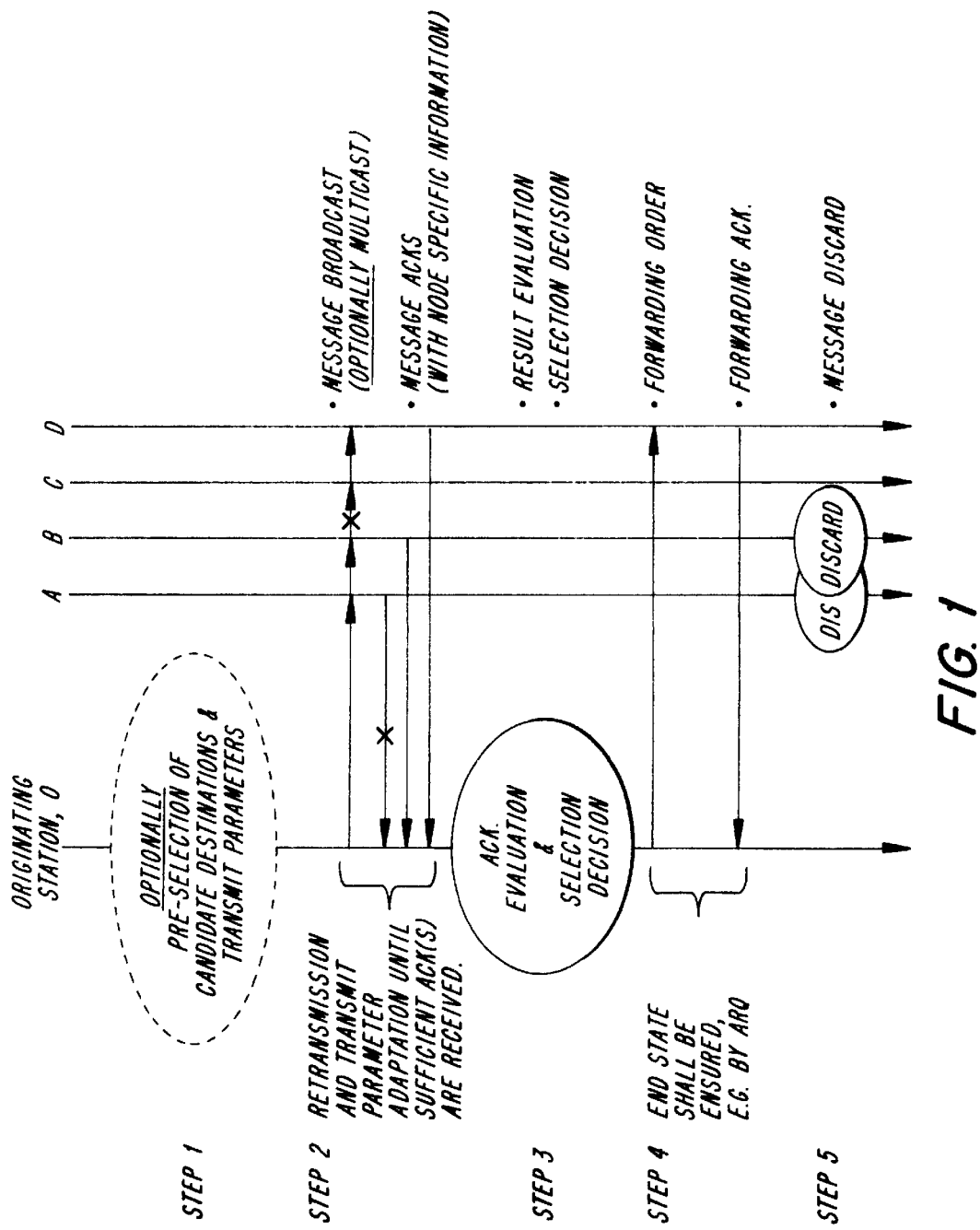
FIG. 1 shows a signaling procedure in accordance with exemplary embodiments of the invention.

FIG. 1 shows a signaling procedure in accordance with an embodiment of the invention. A procedure for forwarding a message through a network of nodes or stations begins with a first originating node O in the network when a data message is generated from a higher layer in the first node or station O, or when the first node O receives a data message from another node. The procedure ensures that the data message is received by only one other node at the end of the procedure.

In particular, as shown in FIG. 1, in optional step 1, candidate intermediate destination nodes and transmit parameters can be pre-selected. The pre-selection can be based on, for example, information provided by a slower routing protocol, and/or overhead information. As shown in step 2, the originating node O sends the data message to an address-unlimited number of nodes, i.e., broadcasts the data message. Alternatively, the originating node O can send the message to an address-limited number of nodes, i.e., can multicast the data message. Transmit parameters and/or other control information can accompany the data message. For example, one set of transmit parameters that can be sent with the data header includes the transmit power $P_{TX}$ and the minimum receive power $P_{RX\_min}$. With this information, the receiving candidate nodes can perform a basic link budget calculation to calculate their individual transmit power such that the minimum receive power $P_{RX\_min}$ is received at the originating node. The level of $P_{RX\_min}$ depends on noise level in the receiver, the used modulation and coding as well as the interference picked up by the antenna.

The other control messages can also convey link budget information for power control purposes. A node which is not involved in a data and control message exchange, but which overhears such communication, can refrain from transmitting data or control messages itself, if it determines that transmitting data or control messages would interfere with the current exchange or a subsequent exchange. The behavior of the node is determined from overheard header information that provides information for a simple link budget as well as an indication of a) which nodes will receive or transmit, and b) when.

As a further example, where the data message is multicast, the control information can designate which intermediate nodes the data message is intended for. The control information can also specify or otherwise influence acknowledgments generated by nodes that successfully receive the data message and control information. In addition, although only 4 intermediate nodes A, B, C, D are shown in FIG. 1, any appropriate number of intermediate nodes can be used or designated.

As shown in step 2 of FIG. 1, nodes A, B and D successfully receive the message from the originating node, and send acknowledgment messages in reply. As shown, the acknowledgment messages from nodes B and D successfully arrive at the originating node O, while the acknowledgment message from node A is not successfully received (due to interference effects, for example). In a situation where no acknowledgment messages successfully arrive at the originating node O, or if the number of acknowledgment messages successfully received at the originating node O is below a predetermined threshold, then the originating node O can retransmit the data message, with the same or different transmit parameters or parameter values, until satisfactory acknowledgment results are achieved. The transmit parameters can include, for example, transmission power, data rate, and Forward Error Correction rate. In addition, retransmission can be performed after a random back-off time, and can exploit carrier sensing, as is known in the art and done, for example, in many medium access protocols, non-persistent CSMA, persistent CSMA, and so forth.

When sufficient acknowledgments are received, in step 3 the originating node evaluates the received acknowledgments and selects one of the acknowledging nodes to forward the data message and thus begin another propagation cycle. In step 4 the originating node O sends a forwarding order to the selected intermediate node (node D, in this case) and then relinquishes responsibility for the data message (e.g., ceases activity regarding the data message) after receiving an acknowledgment from node D that node D successfully received the forwarding order. In the event that node D has no success in forwarding the data message, node D can send a status message to node O indicating D's inability to forward the data message and then node O can try again to forward the data message, for example using other intermediate nodes besides node D.

If the data message arrives in an unacceptable condition at the ultimate destination node, then the ultimate destination node can send an ARQ (Automatic Repeat Request) message back through the network in the same fashion that the data message was forwarded through the network.

Figure 2A:
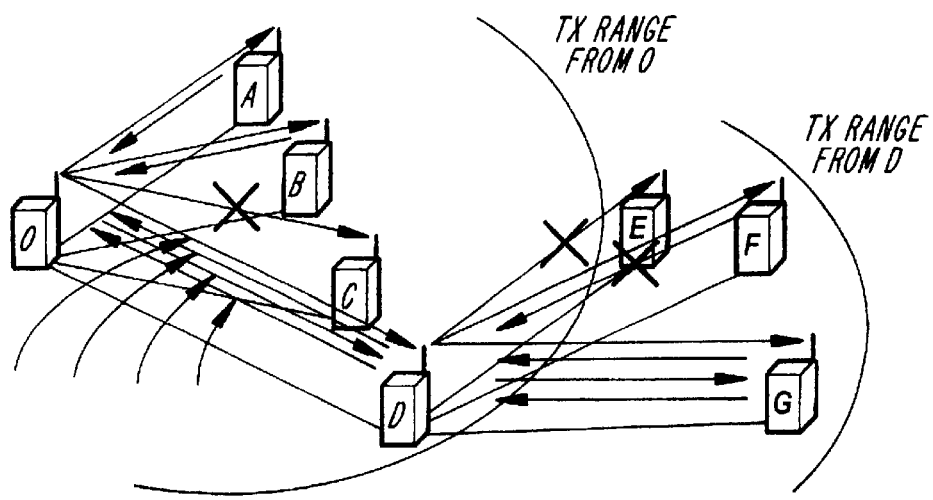
FIG. 2A shows an arrangement of transceivers and communication links between them.
Figure 2B:
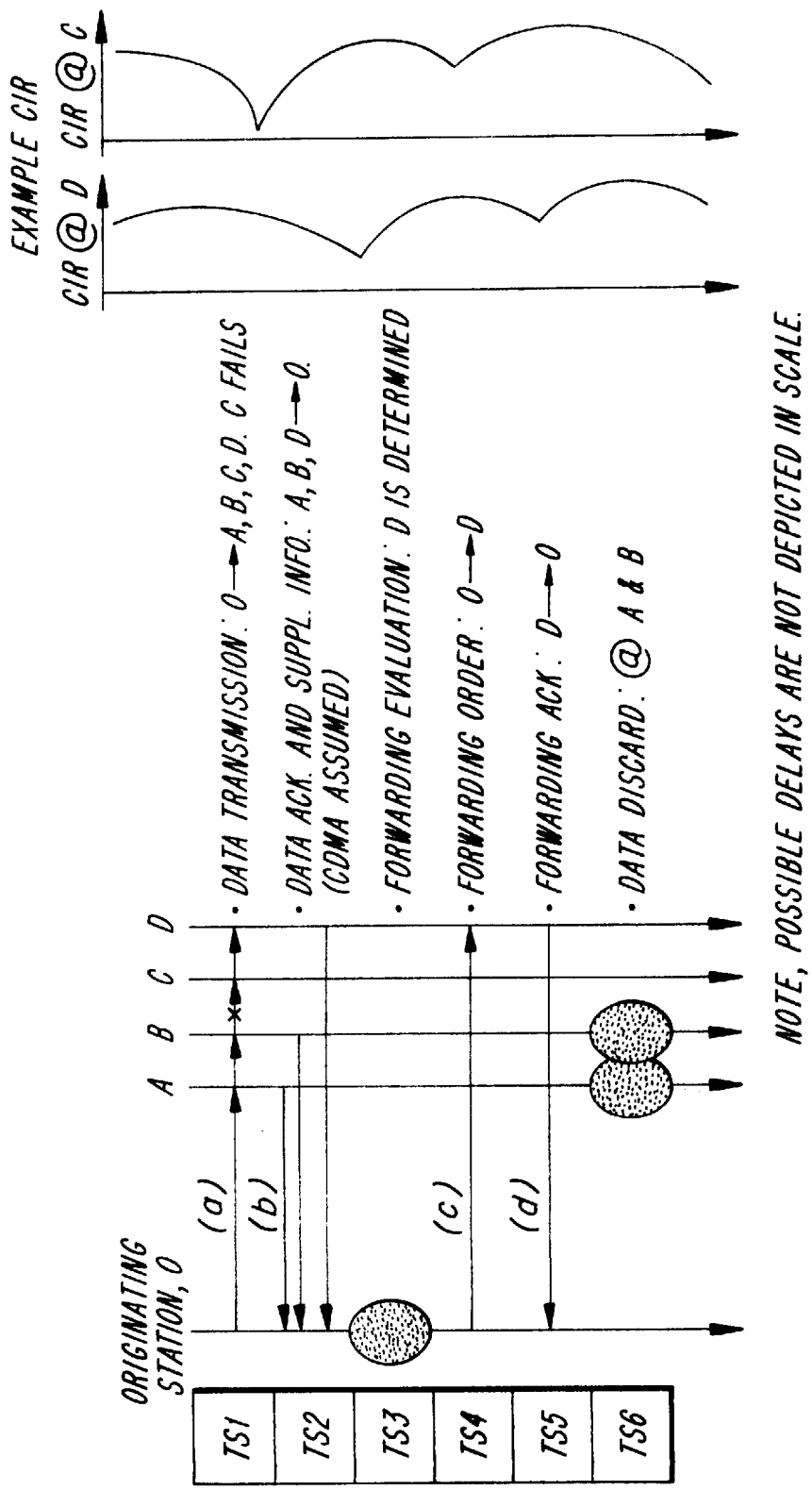
FIG. 2B shows signaling among the transceivers shown in FIG. 2A using signaling procedures in accordance with exemplary embodiments of the invention.
Figure 6:
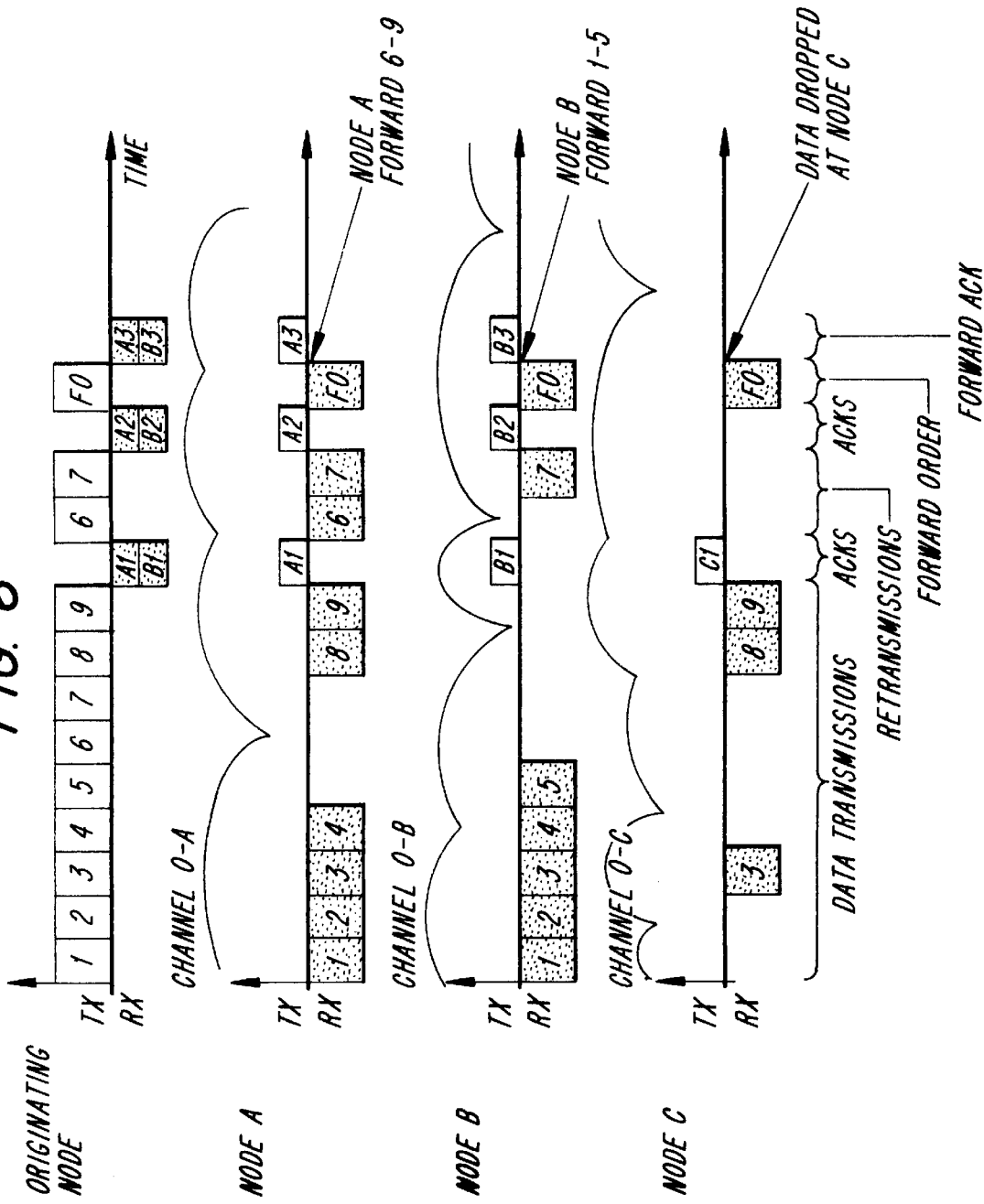
FIG. 6 illustrates data stream splitting in accordance with exemplary embodiments of the invention.

FIG. 2A shows a specific arrangement of nodes or transceivers O and A–G, and also communication links between them. FIG. 2B shows signaling among the nodes, and also shows a Carrier to Interference Ratio (CIR) measure at each of the D and C during the signaling sequence. The CIR measures reflect the effects of fading, for example Rayleigh fading. CIR also reflects the level of interference from other users as well. In the CIR curves shown in FIGS. 2B and 6, the influence of interference from other users is low, and is basically a noise floor. The variations CIR values as shown by the curves in FIGS. 2B and 6, are mainly due to a fading channel.

The signaling sequence shown in FIG. 2B is similar to that shown in FIG. 1, and the principles and options described above with respect to FIG. 1 can apply also to FIGS. 2A, 2B.

As shown generally in FIG. 2A, the node O sends messages to the nodes A, B, C, D, and then later the node D sends messages to the nodes E, F, G, which are further away from the node O. In FIG. 2A, an "X" marking transmissions from O to C, from D to E, and from D to F indicates that these transmissions are unsuccessful. In a first step (or timeslot) TS1 shown in FIG. 2B, the node O sends a data transmission to each of the nodes A, B, C, D. The node C does not successfully receive the transmission. During the first step TS1, the CIR at node D is large or near a maximum. In contrast, the CIR at node C is near a minimum, indicating that this low CIR value is a cause of the node C's failure to successfully receive the data transmission from the node O. In step TS2, the nodes A, B and D send an acknowledgment signal back to the node O. The CIR dip at node D occurs after transmission of the acknowledgment signals, and thus does not prevent the node O from successfully receiving the acknowledgment signals. Note that CIR is different at node O compared to node D, because the interference this is experienced is based on position. In step TS3, the node O determines which of the acknowledging nodes it will send a forwarding order to. In step TS4, the node O sends a forwarding order to the node D, and in step TS5 the node D sends an acknowledgment message to the node O to confirm receipt of the forwarding order. Thereafter, the node D sends data messages to the nodes E, F, G further along the network, as shown in FIG. 2A, to continue propagating the data message through the network. In step TS6, after the node D acknowledges receipt of the forwarding order from the node O, the nodes A, B discard the data message they received from the node O in step TS1. Discarding received data messages can be desirable, for example, to conserve resources at the nodes A, B.

Generally, when a node receives a data message but does not receive a forwarding order instructing it to forward the data message, the node can simply discard the data message upon expiration of a predetermined time period following receipt of the data message. Alternatively, the node can discard the data message when it receives or "overhears" a forwarding command for the data message that is directed or addressed to a different node. These alternative techniques can also be used together.

In accordance with exemplary embodiments of the invention, the data forwarding procedures shown in FIGS. 1, 2A, 2B can be augmented with additional steps. For example, prior to activation of the forwarding procedure, or during times when the forwarding procedure is not in use, data regarding topology and connectivity of the network can be collected and maintained on a relatively slow basis. This data collection can be a continuous process, for example. Then, when the forwarding procedure is activated, the topology and connectivity data can be used to help the originating node (node O, for example) determine which nodes are candidate intermediate destinations (nodes A, B, C, D of FIGS. 1–2, for example). The collection rate of topology and connectivity data is ideally a) high enough to provide each node with general indications of which nodes might be suitable intermediate destinations for data messages traveling in specific directions or to ultimate destinations, while at the same time b) low enough to avoid wasting energy and other system resources maintaining overhead information (such as topology and connectivity data).

Collection of topology and connectivity data can provided via a fabricated "traditional" routing information protocol (RIP), whose purpose is to furnish each node with an estimated (lowest) cost to transmit a data message from the node to a certain destination. Traditional RIP can, for example, accomplish this objective using the asynchronous distributed Bellman Ford algorithm with, for example, a hop metric, a rate metric, or a total average path loss metric.

In conjunction with traditional RIP, each node in the network collects and stores connectivity information. The connectivity information can, for example, be in the form of a path loss matrix between nodes. The information can be based on communication between the node and its neighbors, or can be connectivity information relayed to the node by its neighbors. Typically N:th tier connectivity information may be available at a node, where N represents the number of connections. For example, 4 nodes linked in series would have N=3 connections linking them together. The value N can be set to maintain overhead at a reasonable level. For example, N can be set between 1 and 3.

During pre-selection of intermediate destination candidates, mentioned above for example with respect to optional step 1 of FIG. 1, information gathered through the slow traditional RIP process is assessed when determining intermediate destination, i.e., relay, candidates. One step in this pre-selection process is to select a suitable set of transmit parameters such as coding, rate, power, etc. This influences how many relay candidates are available, and also which relay candidates are available, for selection. A simpler but perhaps less efficient method is to use default values for the transmit parameters and for the number of relay candidates. In summary, a variety of techniques can be used to identify candidate relays, including but not limited to those discussed here.

An important aspect of the invention is that multiple relays are generally available to a node as relay candidates. Having multiple relay candidate nodes available to a node with a data message to forward, provides a degree of branch diversity. A perfect knowledge of connectivity or node availability is generally not necessary because addressing multiple nodes ensures that at least some of them will remain reachable, and provide good connectivity toward the ultimate destination of the data message. In accordance with exemplary embodiments of the invention, the transmit parameters that a node uses when transmitting the data message, and/or parameter and control information, are adaptable. Thus if an originating node (e.g., any node with a data message and the responsibility to forward the data message) finds that candidate relay nodes are not responding to its communications, then the originating node can vary the transmit parameters to increase the chances of successful communication between the originating node and at least one candidate relay node. The transmit parameters can also be adjusted to maximize overall efficiency, for example by reducing unnecessarily high transmission power levels to reduce energy consumption and other undesirable side effects. The transmit parameters can also be adjusted to provide a balance between cost and performance that is appropriate to the situation and system at hand. The transmit parameters can of course be adjusted dynamically, or in advance, or both. For example, when a node receives a data message and the responsibility to forward the data message, the transmit parameters can be set at initial or default values. Then, if the node is unsuccessful in communicating with candidate relay nodes, it can adjust the transmit parameters and try again.

Figure 3:
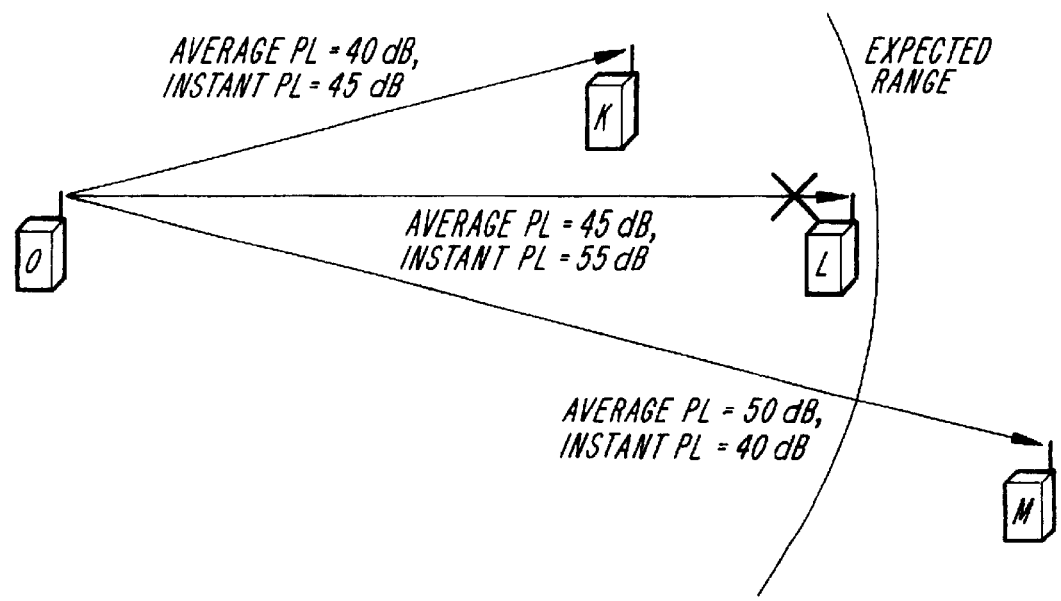
FIG. 3 illustrates how path loss can affect message propagation.

In accordance with an embodiment of the invention, the transmit parameters can be set so there is a high probability that the transmission will reach the closest candidate relay nodes, and also a chance that the transmission will reach one or more candidate relay nodes further out in the direction of propagation. If one of the further nodes can be successfully reached, then there will be fewer hops in the multihop journey of the data message through the network, which can conserve overall energy expenditures per data bit in the forwarding, multihop process. For example, when a path to the further node(s) has a fade peak (e.g., Rayleigh, Rician, or Lognormal), then transmissions can successfully reach the further node(s). FIG. 3 shows an example of this. As shown in FIG. 3, the path from node O to node K has an average path loss of 40 dB, and at this particular time the instant path loss is 45 dB. The path from node O to node L has an average path loss of 45 dB, and an instant path loss of 55 dB. So both the paths from node O to node K and from node O to node L are a little worse at this time instant than they are on average. But the path from node O to node M is in much better condition, since the instant path loss is 40 dB, which is much less than the average path loss of 50 dB. As shown in FIG. 3, the path loss on from node O to node K is too large and prevents successful signal arrival at node L, but a message from node O would arrive safely at both node K and the further node, node M. In situations where the path losses can be predicted to some degree, in accordance with an exemplary embodiment of the invention the transmission parameters at node O can be optimized to take advantage of cyclical path loss. For example, transmissions from the node O can be timed to coincide with path loss minimums for the more distant candidate relay nodes. Where broadcast power is limited, this technique can also be used to minimize transmission power by using just enough broadcast power to successfully contact the nearer candidate relay nodes.

In accordance with an embodiment of the invention, an originating node such as the node O can send a message to multiple candidate relay nodes that are positioned roughly at the same spot. The strategy in this case is to send the message with sufficient power so that a reasonable amount of average energy per bit is experienced at the candidate relay nodes. When the candidate relay nodes each experience different fading channels (e.g., Rayleigh fading channels) with respect to the originating node O, diversity efficiency is realized. This is because thanks to the fading peaks, it is very likely that at least one of the candidate relay nodes will successfully receive the message from the originating node O.

Figure 4A:
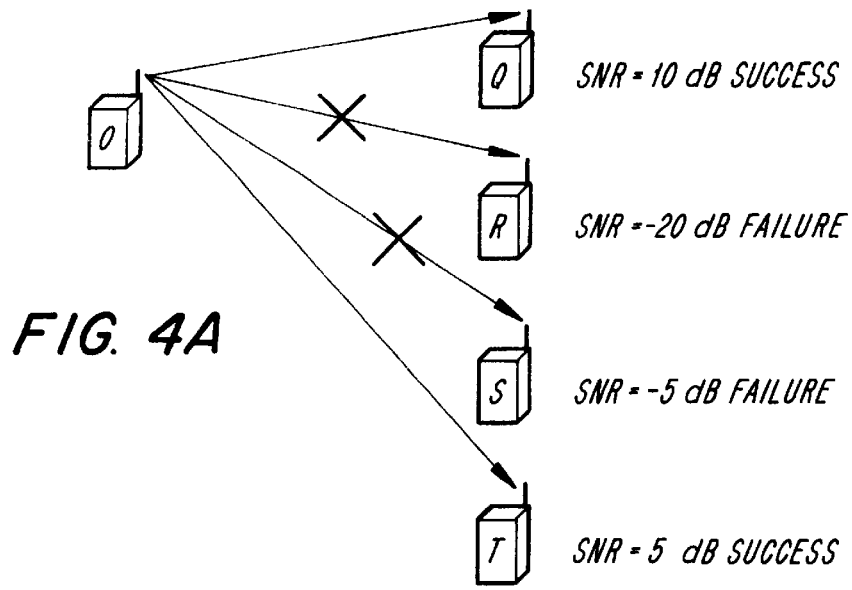
FIG. 4A shows an arrangement of transceivers and communication links between them at various signal to noise levels.
Figure 4B:
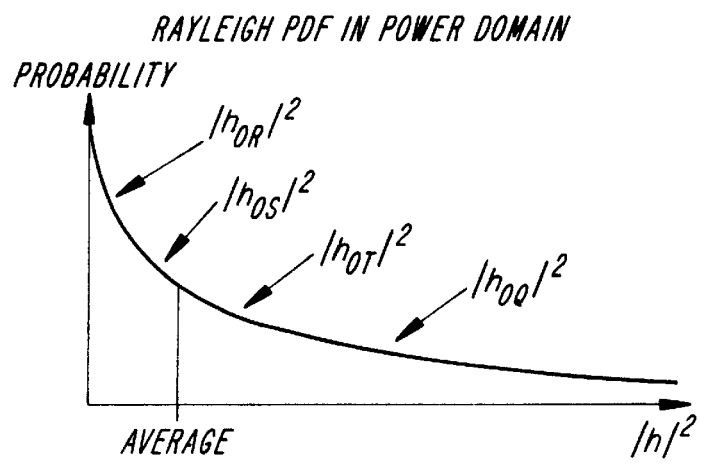
FIG. 4B illustrates the benefits of diversity efficiency in message propagation for the communication links of FIG. 4A.

FIGS. 4A and 4B provide an illustration of these principles. As shown in FIG. 4A, a node O sends a message to each of candidate relay nodes Q, R, S, T. The message is successfully received at nodes Q and T, but is not successfully received at nodes R, S as indicated by the "X" labels along the O-R and O-S paths. FIG. 4B indicates why this is so. In particular, FIG. 4B shows a Rayleigh PDF (Probability Density Function) in the power domain. As indicated in FIG. 4B, at the time of message transmission from node O, the paths O-R, O-S experience a degree of fade that is above an average, while the paths O-T, O-Q experience a degree of fade that is less than the average. In particular as indicated in FIG. 4A, the path O-Q has an SNR (Signal to Noise Ratio) of 10 dB, the path O-R has an SNR of −20 dB, the path O-S has an SNR of −5 dB, and the path O-T has an SNR of 5 dB.

In addition, for a given word error rate (WER), the transmission power from the node O can be reduced significantly, thanks to the high degree of diversity gain provided by this technique. Even when fast fading is not present, diversity gain still effectively enhances performance of the system.

In accordance with embodiments of the invention, the capture effect also makes the system and technique of the invention robust. The capture effect refers to a phenomenon wherein only the stronger of two signals that are at or near the same frequency, is demodulated, and the weaker signal is completely suppressed and rejected as noise. In conjunction with multiple receiving nodes or stations, the capture effect provides a high degree of robustness when data transmissions collide by maximizing the probability that at least one of the nodes will successfully receive the desired transmission. For example, Rayleigh fade peaks and dips can enable concurrent space-coinciding transmissions, or even parallel transmissions. This increases the probability that at least one of the candidate relay nodes will experience a suitable capture ratio. Capture ratio is expressed in dB of signal strength, and is the amount by which the receiving node can differentiate between two separate incoming signals that are on the same frequency. If one of the two signals is stronger than the other by an amount that exceeds the capture ratio, then the stronger signal will be "captured" or received by the receiving node and the weaker signal will be completely suppressed as noise.

Figure 5:
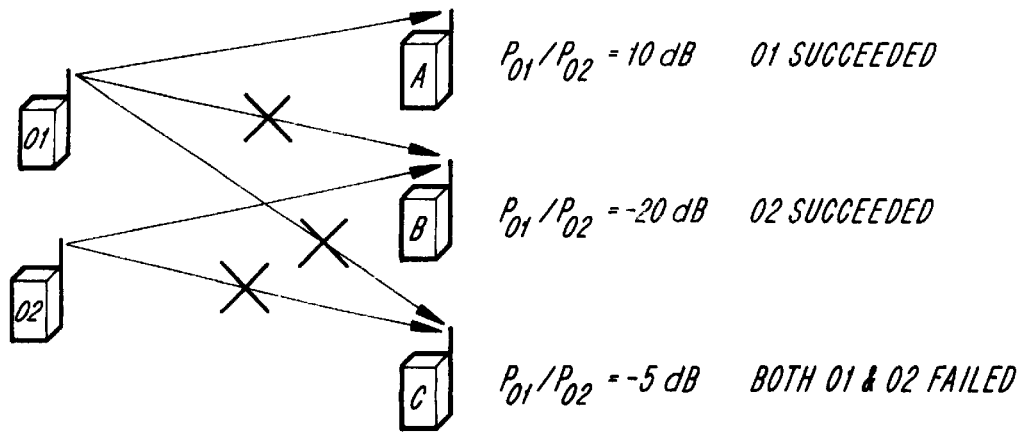
FIG. 5 illustrates how capture effect can benefit message propagation.

FIG. 5 illustrates the capture effect. As shown in FIG. 5, a first originating station $O_1$ and a second originating station $O_2$ each send a message signal. At candidate relay node A, the signal strength ratio $P_{01}/P_{02}=10$ dB, and therefore the message signal from $O_1$ is captured. At candidate relay node B, the signal strength ratio $P_{01}/P_{02}=-20$ dB, and therefore the message signal from $O_2$ is captured. At candidate relay node C, the signal strength ratio $P_{01}/P_{02}=-5$ dB which is below the capture ratio in this particular illustration, and therefore neither message signal is successfully received.

In the context of the present invention, there is also a secondary benefit conferred by the capture effect. Namely, the need for complex network considerate scheduling, and perhaps also carrier sense, is mitigated. Of course, this does not exclude these techniques. For example, confirmation of onward forwarding after data transmission acknowledgments have been received, can be used in this (i.e., carrier sensing and scheduling) and other similar contexts.

As described further above, after a candidate relay node successfully receives a message, it sends back a confirmation or acknowledgment message to the originating node to indicate successful reception. The confirmation message can include not only an acknowledgment of successful reception of the message from the originating node, but can also include up-to-date information about routing cost, connectivity, queue length, remaining battery power (e.g., of the candidate relay node), etc. However, increasing the length of the confirmation message also increases energy consumption, because it takes more time to transmit. Accordingly, benefits of additional information can be balanced against drawbacks of increased energy consumption, based on the particular situation and available system resources.

In addition, the access or transmission order of the acknowledgment messages from the candidate relay nodes can be managed. For example, the acknowledgment order or sequence can depending on the addressing order in the message from the originating node (e.g., the order in which the candidate relay nodes are named in the message). For example, in CDMA/TDD (Code Division Multiple Access/Time Division Duplex), codes can be given out in an orderly fashion so that multiple responses are possible within the same timeslot.

Confirmation/acknowledgment messages and techniques can be optimized in different ways. For example, in order to optimize power efficiency, we want the "most suitable" candidate relay node to respond before less suitable candidate relay nodes. This can reduce energy consumption, for example, in an arrangement where the less suitable candidate relay nodes remain silent after receiving a message from the originating node, if they overhear the most suitable candidate relay node send an acknowledgment message within a predetermined time period. In other words, the less suitable candidate relay nodes wait for a little while before responding, to give the most suitable candidate relay node time to respond. However, in the arrangement the delay can be inversely proportional to the cost of reaching the destination. For example, a risk is that a suitable distant candidate relay does not exist, or fails to successfully receive the message, in which case the delay until the originating node receives an acknowledgment message will be relatively long. In another example, to minimize delay, we can let all of the candidate relay nodes respond as quickly as possible to minimize delay. However, this may waste extra energy. The appropriate balance point between these tradeoffs, can be selected based specific optimization goals, circumstances and available resources within the system.

In a case where none or few candidate relay nodes respond, the originating node can a) poll for acknowledgment messages, b) retransmit the data message, or c) do a combination of both. As a further option, the originating node can address different candidate relay nodes.

When the originating node retransmits the data message, the transmit parameters can be adapted and adjusted to improve the possibility that the retransmission will be acceptable, as indicated further above. For example, the originating node can successively increase transmission power at each transmit occasion when no responses are detected from the candidate relay nodes. Optionally, the originating node can send a "short" high power (but low energy, because of short time duration) poll message to find neighboring nodes, rather than wasting energy transmitting data messages (which are longer/larger and require more time, and therefore more energy, to transmit).

After the originating node receives acknowledgments, it evaluates the acknowledgments together with supplementary information and then decides which of the acknowledging candidate relay nodes it will instruct to forward the data message. An example of this is illustrated in FIG. 2B, where in step TS3 the originating node O determines which that node D is the one to forward the data message, and then in step TS4 sends a forwarding order to the node D. The originating node can use a variety of different selection algorithms to decide which node it will instruct to forward the data message, as skilled in the art will recognize. Those skilled in the art will further appreciate that the selection algorithm can be chosen based on the particular situation, goals and system resources at hand. In accordance with embodiments of the invention, the selection algorithm can include, for example, an evaluation of which candidate relay nodes successfully acknowledged the data message transmission, and an average cost experienced by those candidate relay nodes that did successfully acknowledge the data message transmission. Degrees of connectivity ahead of the candidate relay nodes, status of queues, battery fairness (e.g., spreading work among different nodes so that no single node ends up expending significantly more battery power than the other nodes), and battery charge levels of different nodes, can all be factors considered as part of the selection algorithm. Of course, other appropriate factors can also be considered.

Furthermore, different selection algorithms can be used, and/or specific selection algorithms can be tuned or optimized, to achieve different goals. For example, one goal might be energy efficiency, while another goal might be throughput efficiency. However, all of the algorithms should ensure that the data message moves, on average, in a correct direction towards the final destination.

After the originating node sends the forwarding order, it waits to receive an acknowledgment that the forwarding order was successfully received. This is illustrated, for example, in FIG. 2B, step TS5. Traditional ARQ (Automatic Repeat Request) methods can be used to ensure that states in the originating node and the selected node (the node to which the originating node sent the forwarding order) are well defined, for example by using timers and forced replies.

As discussed further above and as shown in FIG. 2B, step TS6, after the forwarding order is acknowledged, the other candidate relay nodes that successfully received the data message, discard the data message and any associated information that is no longer necessary. As mentioned earlier, this discard procedure can be managed by a discard timer that is set or triggered when the data message is first received. The received data can be considered no longer necessary, if when the discard timer expires, the node has not yet received a forwarding order. The time period of the discard timer can be a predetermined or default value. As an alternative or in addition, the time period can be set using information included with data message. In other words, the time period of the discard timer can be one of the transmit parameters that the originating node can adapt in response to present conditions or new objectives.

As an alternative or additional discard procedure, a candidate relay node can discard the information when it overhears a forwarding order directed to another node with respect to the information.

In accordance with embodiments of the invention, multiple packet transmission and data stream splitting can also be used to advantage. Multiple packet transmission means that several packets or messages are sent before acknowledgments are sent in reply. This improves the energy ratio of a) energy required to transmit data, to b) energy required to transmit confirmation that the transmitted data has be received.

Data stream splitting means that in a multiple-packet transaction, several candidate relay nodes can get forwarding orders for different subsets of the transmitted packets or messages. FIG. 6 illustrates a simple example of this. FIG. 6 shows a timeline for each of the nodes O, A, B, and C, wherein transmissions are immediately above the timeline and receptions are immediately below the timeline. CIR values over time are also shown for each of the channels O-A, O-B, and O-C.

FIG. 6 illustrates both multiple packet transmission, and data stream splitting. As shown in FIG. 6, the originating node O sequentially transmits the packets 1–9. Node A receives packets 1–4 and 8–9, but does not successfully receive the packets 5–7. Node B receives only packets 1–5, and node C receives only packets 3 and 8–9. After the originating node O sends the last packet 9 in the cluster, each of the nodes A, B, C sends an acknowledgment signal (A1, B1, C1 respectively), thereby indicating which packets were successfully received. As shown in FIG. 6, the originating node O successfully receives the acknowledgment signals A1, B1 from nodes A and B, but does not receive the acknowledgment signal C1 from node C.

After receiving and evaluating the acknowledgment signals, the originating node O determines which packets were not received (to the best of its knowledge, based on the received acknowledgment signals) and retransmits those packets. Thus, in the case illustrated in FIG. 6, the originating node O resends packets 6–7. Node A successfully receives both of the resent packets 6–7, and replies with an acknowledgment A2. Node B receives only the resent packet 7, and replies with an acknowledgment B2. The node C receives neither of the resent packets 6–7, and sends no acknowledgment. After evaluating the acknowledgments A2, B2, the originating node O sends a forwarding order indicating that node A should forward packets 6–9, and node B should forward packets 1–5. Each of the nodes A, B, C successfully receives the forwarding order, and in response the nodes A, B send acknowledgments (and then proceed to carry out the forwarding order), and node C discards the information it has received. In the event that the originating node does not receive an acknowledgment from node A regarding the resent packets 6–7, then the originating node can continue the resending procedure (adjusting transmit parameters appropriately) until acknowledgments are received for all of the packets.

This procedure can be easily adapted to address various objectives. For example, if a degree of redundancy is desired, so that each packet is received by at least J candidate relay nodes (where J is the degree of redundancy, for example J=2), the originating node can keep resending packets until acknowledgments indicate that each packet has been successfully received by at least J candidate relay nodes. In FIG. 6, J=1. Setting J greater than 1 can, for example, provide the originating node with more options when selecting which candidate relay nodes to send forwarding orders to.

In FIG. 6, the originating node sends the forwarding order after it receives positive acknowledgments for all of the packets. Alternatively, packet forwarding can be split in time as well as in path, so that when some but not all packets are successfully received and acknowledged, the originating node orders them forwarded and then labors to retransmit the remaining packets. The rate or magnitude of time splitting can be controlled, for example, by issuing a forwarding order only when a number of successfully received and acknowledged packets equals or exceeds a predetermined or dynamically determined threshold value. Thus, the threshold value can be one of the adaptable transmit parameters. The threshold value can range, for example, from 1 to the number of packets in the cluster. (In FIG. 6, the threshold value equals the number of packets in the cluster, so that there is no time splitting).

Packets can also be combined into clusters. For example, candidate relay nodes can delay sending acknowledgments (and originating nodes can delay resending packets or polling queries), so that candidate relay nodes have an opportunity to collect packets from different originating nodes. A subsequent acknowledgment from a candidate relay node can indicate to an originating node that the candidate relay node has other packets, from other originating nodes. The originating nodes can use this kind of information to generate forwarding orders that allow individual packets and subclusters of packets to be combined and then forwarded in a single cluster of packets.

For example, a forwarding order from a first originating node can instruct a candidate relay node that it should forward data packets from that originating node, but preferably together with several received packets from a second originating node. Thus the candidate relay node should wait for a time, and listen for a forwarding order from the second originating node. If a forwarding order from the second originating node is received within the time period, then the candidate relay node forwards all of the respective packets together, for example sequentially in a single cluster. If, however, at the end of the time period no forwarding order has been received from the second originating node, then the candidate relay node can abandon the effort to make this combination and simply forward the packets it received from the first originating node. Those skilled in the art will recognize that other appropriate combining techniques can be used within the conceptual framework of the invention.

Figure 7:
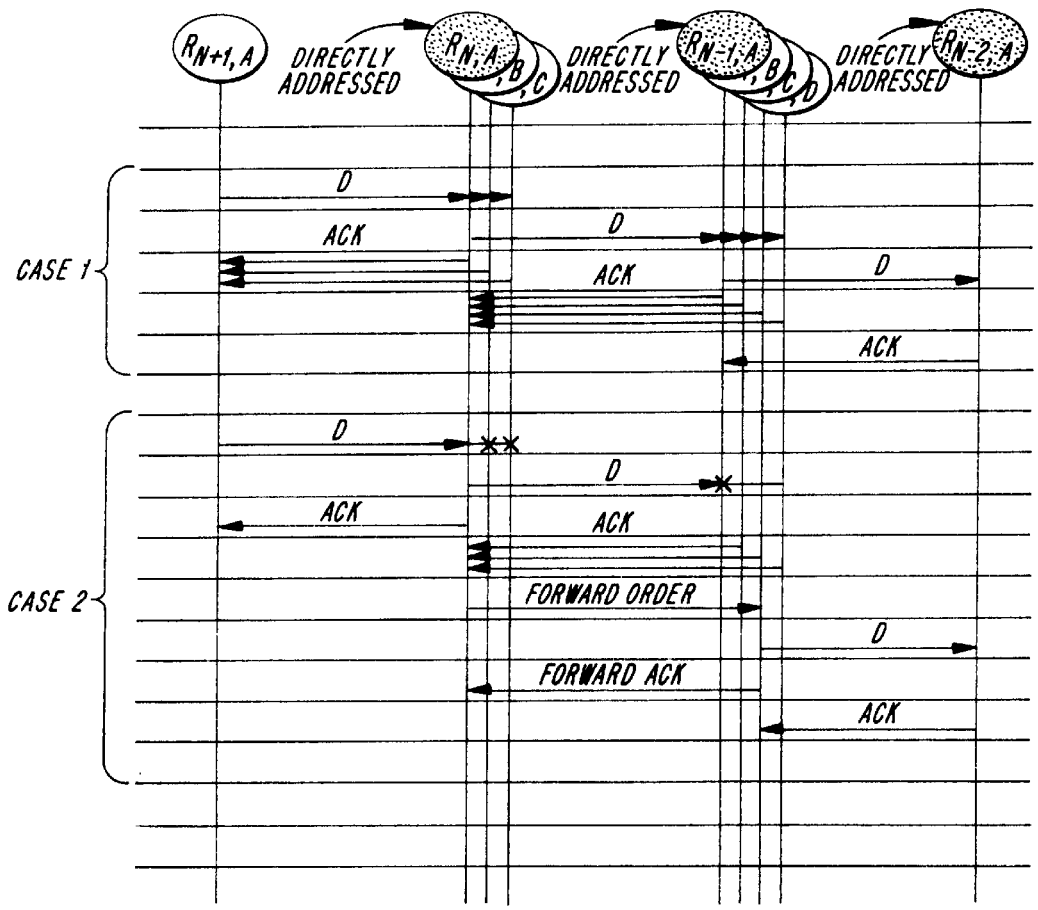
FIG. 7 illustrates a fast-packet forwarding method in accordance with exemplary embodiments of the invention.
Figure 8:
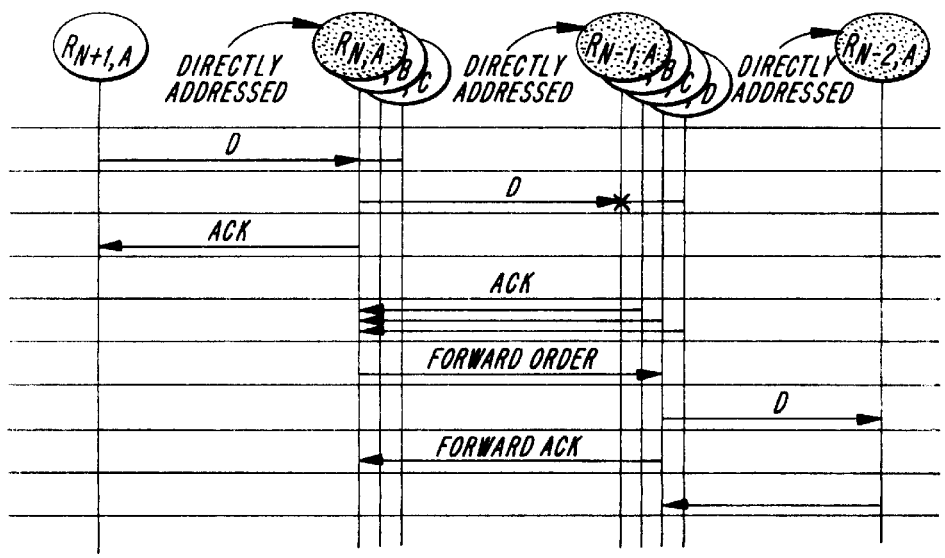
FIG. 8 illustrates a fast-packet forwarding method in accordance with exemplary embodiments of the invention.

In accordance with other embodiments of the invention, instead of first sending a data message and later sending a forwarding order after receiving an acknowledgment confirming receipt of the data message, the originating node sends the forwarding order together with, or as part of, the data message. The forwarding order designates a candidate relay node, and instructs the designated node to immediately forward the data message. When the designated node successfully receives the data message and the forwarding order together, the data message moves more quickly through the network because the designated node need not reply with an acknowledgment and then wait for a separate forwarding order. In accordance with the invention, in the event the designated node does not successfully receive the information, backup procedures are invoked to continue moving the information toward its destination. These backup procedures are similar or identical to the procedures described further above. FIGS. 7–8 illustrate specific aspects of this technique.

As shown in FIG. 7, case 1, data is sent to an explicitly designated or addressed candidate relay node, as well as other candidate relay nodes. If the explicitly addressed node successfully receives the data, then it immediately forwards the data and afterwards replies to the originating node with an acknowledgment. Specifically, the originating node R(N+1, A) sends data to each of the candidate relay nodes R(N, A . . . C). The data includes an indication that the candidate relay node R(N, A) is the designated node. Each of the nodes R(N, A . . . C) successfully receives the data, and the node R(N, A) immediately forwards the data (but this time including an indication that R(N–1, A) is the designated node) to each of the nodes R(N–1, A . . . D). After the node R(N,A) forwards the data, all of the nodes R(N, A . . . C) reply to the originating node R(N+1, A) with acknowledgments. Each of the nodes R(N–1, A . . . D) successfully receives the data and the pattern repeats in a similar fashion, except that when the node R(N–1, A) forwards the data, only one node is within range, the designated node R(N–2,A).

When a designated node does not positively acknowledge receipt of the data, then the originating node selects one of the other (non-designated) candidate relay nodes and sends a forwarding order. This is illustrated in the center portion of FIG. 7, case 2, which shows that the originating node R(N, A) forwards the data to the candidate relay nodes R(N–1, A . . . D), but the designated node R(N–1, A) does not receive the data and therefore does not reply with an acknowledgment. Accordingly, after evaluating acknowledgments from the non-designated nodes R(N–1, B . . . D), the originating node R(N, A) selects the node R(N–1, C), and sends a forwarding order instructing it to forward the data.

The first portion of FIG. 7, case 2, is slightly different from that of FIG. 7, case 1. The first portion of case 2 shows a situation where only the designated node R(N, A) receives data from the originating node R(N+1, A), and therefore it is the only node to reply with an acknowledgment after forwarding the data to the nodes R(N–1, A).

FIG. 8 illustrates a procedure similar to that shown in FIG. 7, but with an additional refinement. Specifically, non-designated nodes wait for a time after receiving data from an originating node. If the designated node replies before the time period expires, then the non-designated nodes remain silent, and can discard the data. If at the end of the time period, the designated node has not yet sent an acknowledgment reply to the originating node, then the non-designated nodes send acknowledgment replies.

This technique tends to reduce energy expenditures, but can increase transit time of the data message through the network. For example, when the designated candidate relay node successfully receives and acknowledges the data, energy is conserved because the non-designated candidate relay nodes that also received the data, remain silent instead of generating an acknowledgment reply to the originating node. However, when the designated candidate relay node is not available to the originating node, then transit time through the network increases because the non-designated candidate relay nodes will wait for a time before replying. In addition, energy is not conserved because all of the non-designated candidate relay nodes that received the data will reply As shown in FIG. 8, data sent from the originating node R(N+1, A) is successfully received at all of the candidate relay nodes R(N, A . . . C). The sent data includes an indication that the node R(N, A) is a designated node. The designated node R(N, A) replies to the originating node R(N+1, A) with an acknowledgment, and the non-designated nodes that received the sent data, i.e., the nodes R(N, B . . . C), hear the designated node's acknowledgment or data transmission and therefore do not reply to the originating node R(N+1, A).

Before sending the acknowledgment reply, the designated node R(N, A) forwards the data (with an indication, this time, that the candidate relay node R(N–1, A) is the designated node) to the nodes R(N–1, A . . . D). However, the designated node R(N–1, A) does not successfully receive the data, and therefore does not reply with an acknowledgment. The non-designated nodes R(N–1, B . . . D) wait for a time, and listen for a reply from the designated node R(N–1, A) to the originating node R(N, A). When the time period expires without a reply from the designated node, each of the non-designated nodes R(N–1, B . . . D) replies to the originating node R(N, A) with an acknowledgment so that the originating node R(N, A) can arrange for one of the non-designated nodes to forward the data. The originating node R(N, A) receives these acknowledgments, selects the node R(N–1, C), and then sends a forwarding order to the node R(N–1, C). The node R(N–1, C) successfully receives the forwarding order, and then complies by forwarding the data to a single candidate node R(N–2, A) and then replying to the originating node R(N–1, C) with an acknowledgment of the forwarding order.

The technique of FIG. 8 in effect divides the candidate relay nodes into two groups, a first group containing only the designated node, and a second group containing the non-designated nodes, which waits to acknowledge transmissions from the originating node. This technique can be altered, so that the candidate relay nodes are divided into more than 2 groups. The last group would contain all non-designated nodes, that wait for a longest time period before replying. The preceding groups would each contain one designated node, and also a different time period to effectively rank the designated nodes. The first group would be the same, as in FIG. 8, containing only the designated node, and no time period. However, the interim groups each contain one designated node have time period that is longer than the time period of the preceding group, and shorter than the time period of the next group behind it. Here, the forwarding order indicates which nodes are in which groups, and also the time period for each group. If the designated node in the first group does not acknowledge within the time period of the second group, then the node in the second group will forward the data message and acknowledge, if it successfully received the forwarding order. If it did not, then it will be silent. If the designated node in the next group does not hear an acknowledgment, by the time its (longer) time period expires, then it will forward the data message and acknowledge, assuming it successfully received the forwarding order and data message. Thus, the forwarding order designates multiple nodes but ranks them so that if one fails, then the next subordinate designated node will have a chance to execute the forwarding order and comply. If all of the designated nodes fail to successfully receive the forwarding order and the data message, then last of all, the non-designated nodes in the last group, that received the data message, acknowledge in the fashion described with respect to FIG. 8.

As shown for example in FIGS. 7–8, the acknowledgment replies can be sequenced so they do not collide at the originating node. Transmit parameters accompanying the data transmitted from the originating node can indicate, for example, an order in which the candidate relay nodes should reply with acknowledgments. In a CDMA system, the transmit parameters accompanying the data transmitted from the originating node, can prevent collisions by indicating which orthogonal codes the candidate relay nodes should use to reply with.

In the embodiments described above the data message is generally sent as a first communication (either prior to, or together with, a forwarding order) from an originating node to a candidate relay node. Alternatively, a shorter message, whose main function is to reach the candidate relay nodes and elicit replies, can be sent first. Then, after communication with one or more of the candidate relay nodes has been successfully established, the data message can be sent to one or more of these candidate relay nodes that responded. In this situation the data message can be sent together with, or prior to, an appropriate forwarding order.

Figure 9:
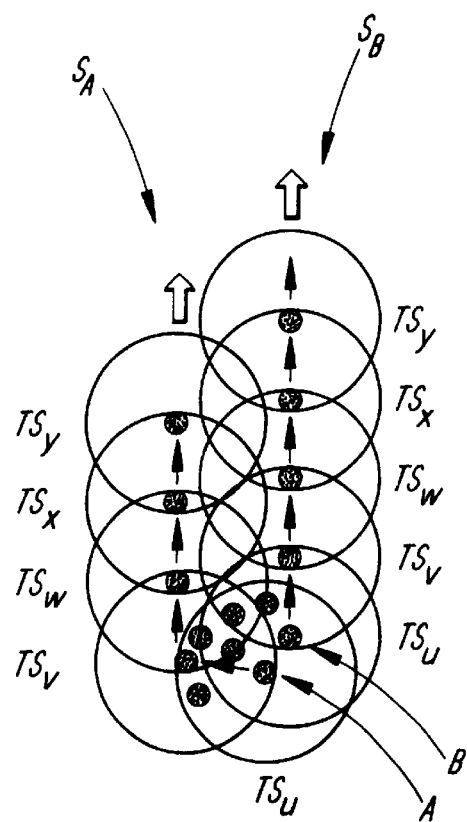
FIG. 9 illustrates how data load is naturally distributed in accordance with exemplary embodiments of the invention.

It is worthwhile to point out that exemplary embodiments of the invention naturally distribute the data load among relay nodes. This principle is illustrated in FIG. 9. As shown in FIG. 9, a first packet is sent from point A at the same time a second, different packet is sent from the point B. The points A, B are proximate. Each circle in FIG. 9 indicates an outer range of a transmission from a point at the center of the circle. The dots in FIG. 9 represent candidate relay nodes. $TS_u$–$TS_y$ represent sequential time slots. Thus, transmissions (circles) that are marked with the same time slot symbol, occur at the same time. When the first and second packets are initially sent out from the points A, B, those candidate relay nodes that receive one of the packets with a sufficiently high CIR will reply to the respective originating node at one of A, B. Thus, due to the capture effect and other factors described further above such as diversity efficiency, some of the candidate nodes near the nodes A, B will receive the first packet, and others will receive the second packet. The two packets will in effect repel each other with respect to candidate relay nodes, until they do not mutually disturb each other's propagation through the network. As shown for example in FIG. 9, the propagation paths $S_A$, $S_B$ begin near each other from the nodes A, B, and then quickly separate until each is not adversely affected by the other's transmissions. Note for example that the transmission circles of $S_A$ do not reach the relay nodes of the $S_B$, and vice versa. Note also that it is assumed that candidate relay nodes are available in sufficient numbers, and with an appropriate distribution, so as to enable load distribution.

In accordance with another exemplary embodiment of the invention, the originating node can give away forwarding decision control to another node. One advantage of giving away forwarding decision control is that control traffic is limited to a smaller geographical area. This saves some control traffic energy, and also reduces interference.

Figure 11:
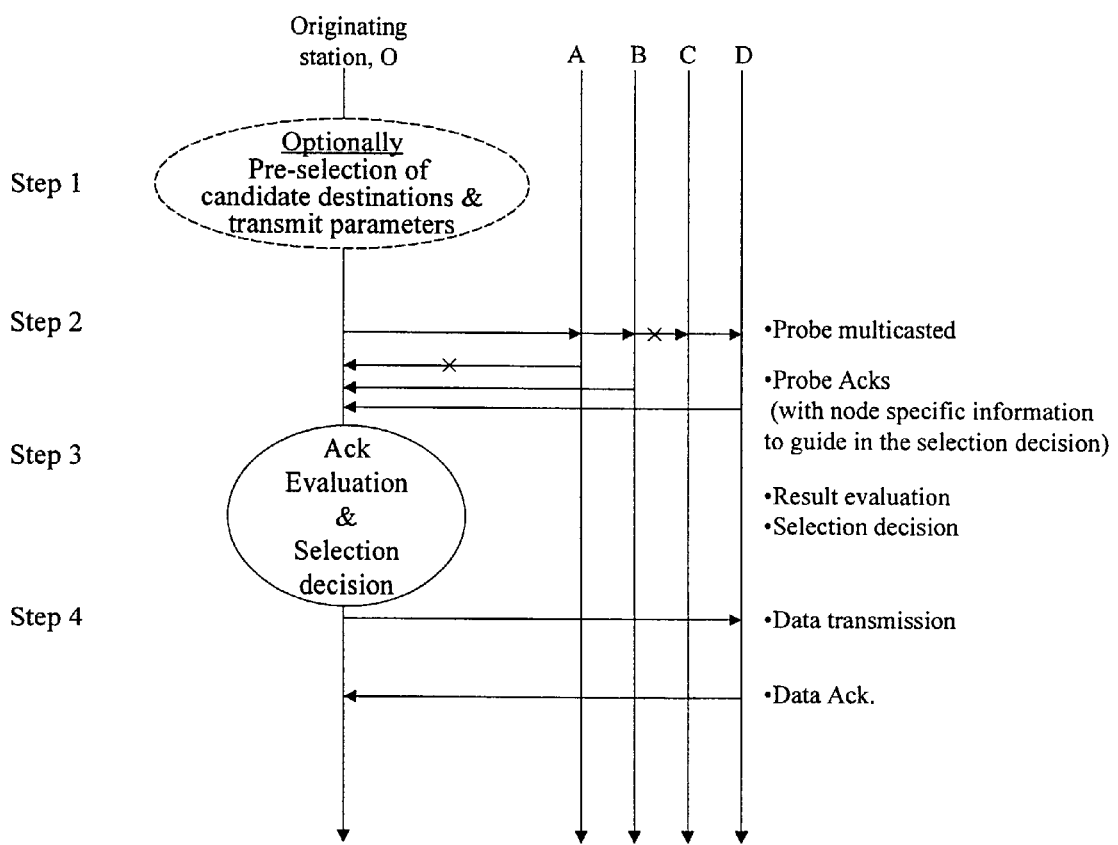
FIG. 11 illustrates a signaling procedure in accordance with exemplary embodiments of the invention.

*In accordance with another exemplary embodiment of the invention shown in step 2 of FIG. 11, an originating node or station multicasts a probing message to a set of candidate nodes. The probing message does not include data that the originating node is trying to forward to an ultimate or interim destination. The multicast can take place at an instance when a packet shall or can be sent. As shown in step 2, responses from the candidate nodes are transmitted to the originating node, in the same manner for example that messages are sent and acknowledged as shown in FIGS. 1 and 2B. The responses from the candidate nodes can, for example, be sequentially returned to the originating node in an orderly manner. Based on the responses received from candidate notes, including for example the presence of a response and information contained in the response, the originating node decides which node to send the data to, as shown in step 3 of FIG. 11. In step 4, the originating node sends the data to the candidate node that it selected in step 3**, and the selected node acknowledges receipt of the data.

If the originating node does not receive an acknowledgment of data receipt from the selected candidate node, the originating node can then select another of the candidate nodes (based for example on the information gathered by the originating node in step 2), and send the data to the newly selected candidate node. This can repeat until a selected candidate node acknowledges receipt of the data within a predetermined time interval, or until a different predetermined condition is fulfilled (for example, a predetermined number of repetitions, an overall predetermined time interval in which the originating node tries to send the data to selected ones of the candidate nodes, and so forth). Alternatively, after sending the data to a selected candidate node and then failing to receive an acknowledgment from the selected candidate node (for example within a time interval from sending the data), the originating node can multicast or broadcast a query that instructs nodes that received the data to acknowledge, or instructs nodes to reply and indicate whether the respective node received the data. The query can include instructions to the nodes on how to reply to, or acknowledge, the query, including a sequential order that the nodes should reply in. Based on the replies/acknowledgments, the originating node can select one of the nodes that successfully received the data, and send a message to it instructing it to forward the data onward. Alternatively, if in step 4 the originating node does not receive an acknowledgment, then the originating node can start the process over (beginning at step 1, or step 2), using the same group of candidate nodes or a different group of candidate nodes. In all cases, a predetermined condition can be applied, so that when the predetermined condition is met, the originating node stops trying to forward the data, and can discard the data. The predetermined condition can be for example a) a maximum number or retransmissions, and/or expiration of a time interval that began when the originating node first entered step 2 with respect to this data, and so forth. In other respects, the embodiment shown in FIG. 11 operates as in, or consistent with, the other embodiments.

In summary, in accordance with the embodiment shown in FIG. 11, paths are tested and a decision is made on where to route data, prior to sending or forwarding the data is sent. This embodiment can be used, for example, when the channel and interference fluctuate relatively slowly, so that conditions at the time the probe message is multicast will be the same as, or similar to, conditions when the data is later transmitted.

In a variation of the embodiment shown in FIG. 11, the first multicast probe can reserve the channel, such that all nodes hearing and not being addressed must be silent for a predetermined time duration, or for a time duration indicated in the multicast probe. Similarly, the responses from the candidate nodes can also instruct or (for example, by their presence) remind nodes that are not the originating node to be silent for a predetermined time duration or for a time duration indicated in the responses. In this manner, the DATA and ACK messages may be transferred without interruption.

This function is somewhat analogous to the channel access scheme employed by 802.11 [1] where so called RTS (Request To Send) and CTS (Clear to Send) reserve the channel prior to data transmission and successive Acknowledgment. The advantage with the RTS-CTS scheme is the suppression of transmissions from hidden nodes. Hidden nodes are nodes being out of reach for RTS transmissions but can interfere with the reception at the node receiving the RTS message and data message. The difference from classical RTS-CTS-DATA-ACK frame exchange is that in accordance with exemplary embodiments of the present invention, RTS is extended to multicast and multiple CTSs are returned. As multiple nodes respond with individual CTSs there is a risk that a slightly larger area is freed from additional medium accesses than actually required. As forwarding nodes are likely to be in roughly the same area, this area extension is not considered to be a major problem.

Figure 10:
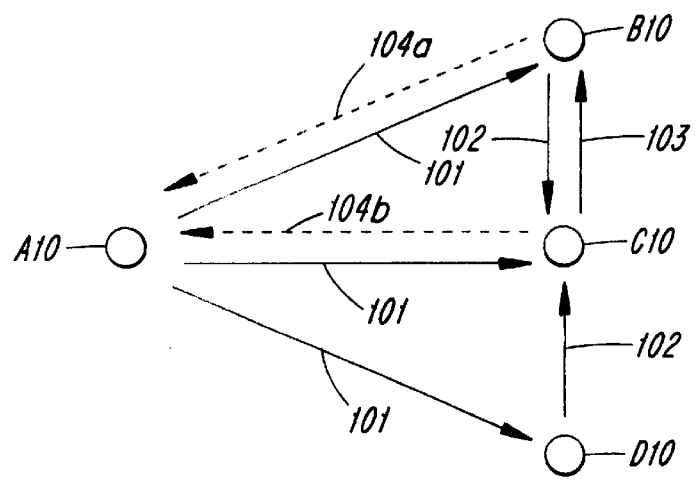
FIG. 10 illustrates signaling procedures in accordance with an embodiment of the invention.

In a situation where the originating node gives away forwarding decision control to another node, one forwarding acknowledgment must still be returned to the originating node, so that the originating node will relinquish responsibility instead of pursuing additional measures to forward the data. The forwarding acknowledgment can come from the node to which the originating node gave forwarding decision control. Alternatively, when the originating (first) node gives forwarding decision control to another (second) node and that (second) node sends a forwarding order to a third node, the third node can send a forwarding acknowledgment to the first, originating node. These principles are illustrated in FIG. 10, where an originating node A10 sends data to neighboring nodes B10, C10 and D10 in a first transmission 101 that also transfers forwarding decision control to the node C10. The nodes B10, D10 each send an acknowledgment 102 indicating status information and successful reception of the data transmission 101. The controller node C10 receives the acknowledgments 102, selects the node B10, and sends a forwarding order 103 to the node B10. The node B10 can send a forwarding acknowledgment 104a to the originating node A10. Alternatively, the controller node C10 can send a forwarding acknowledgment 104b to the originating node A10. Those skilled in the art will appreciate that these techniques can be appropriately combined with, or modified by, other exemplary embodiments of the invention described further above and shown, for example, in the previous Figures.

In addition, the described techniques and procedures enhance robustness of multi-hop data transmission against detrimental effects of such things as high delay spread and fast fading channels. The robustness is improved since it is likely that at least one of the candidate relays will see at least one good candidate relay node with not too much delay spread or fast fading.

In summary, exemplary embodiments of the invention described above provide significant advantages. For example, the amount of energy needed to successfully transmit information is minimized, because utilization of good channel peaks or peaks of opportunity is probabilistically guaranteed because of the fading channels (e.g., Rayleigh, Rician, Lognormal, and absence of interferer). Energy requirements are also minimized by making transmissions that have a low energy/distance ratio. This is possible because when multiple candidate relay nodes are used, all experiencing a low C/I ratio and therefore a high error rate, at least one of them is likely to correctly receive the data transmission. Rapid transit of the data through the network is made possible because of short delays at individual hops and high throughput, which are in turn possible because interleaving with coding is not necessary to combat fading dips, and because comparatively few control messages are required. Yet another advantage is the ability to support concurrent, space-coinciding transmissions, which is due to probabilistically guaranteed capture ability in conjunction with the presence of fading channels and the availability of multiple receivers or candidate relay nodes. Reliability is also enhanced under conditions that change in response to changes in mobility or channel characteristics. This is because, in contrast with circuit switched cases or traditional Bellman Ford routing procedures, in embodiments of the invention redundant nodes and therefore alternative routes are always available. Embodiments of the invention also automatically provide load distribution as a beneficial side effect. This is due to the fact that interfering or competing transmissions will automatically repel each other until they cause no mutual disturbances as they propagate in a multi-hop fashion through the network. Furthermore, it is worth pointing out that the proposed methods and procedures make forwarding decisions based on facts regarding data reception and characteristics of the network, rather than on speculation regarding successful data reception as in prior art methods.

Those of ordinary skill in the art will also realize, that the principles of the present invention have broad application beyond wireless networks, and can apply to transmission of information or materials through any system comprising a network of nodes where the links between the nodes vary in quality and availability over time.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method of forwarding information in a multi-hop network having a plurality of network nodes, said method comprising the steps of:

transmitting a message from an originating node to a plurality of candidate relay nodes in a general direction in which the information is to be forwarded;

transmitting from each of the candidate relay nodes that successfully received the message, an acknowledgment of the message to the originating node;

selecting by the originating node, at least one of the candidate relay nodes that acknowledged receiving the message;

transmitting a forwarding order from the originating node to the selected candidate relay node, said order instructing the selected node to forward the previously received message to a next node;

forwarding the message to the next node by the selected relay node; and transmitting an acknowledgment of the forwarding order from the selected candidate relay node to the originating node.

2. The method of claim 1, wherein the steps of transmitting the message, transmitting the acknowledgment of the message, selecting one of the candidate relay nodes, transmitting the forwarding order, forwarding the message, and transmitting the acknowledgment of the forwarding order are repeated until the message traverses the multi-hop network.

3. The method of claim 1, further comprising the step of altering transmit parameters and repeating the step of transmitting the message from the originating node, when the originating node does not receive an acknowledgment of the message from any of the plurality of candidate relay nodes.

4. The method of claim 1, further comprising the step of altering transmit parameters and repeating the step of transmitting the message from the originating node, when the originating node receives less than a predetermined number of acknowledgments of the message.

5. A method of forwarding information in a multi-hop network having a plurality of network nodes, said method comprising the steps of:

transmitting a message from an originating node directly to a plurality of candidate relay nodes without a sensing channel, wherein the message is transmitted in a general direction in which the information is to be forwarded;

transmitting from each of the candidate relay nodes that successfully received the message, an acknowledgment of the message to the originating node, said acknowledgment including node-specific information related to cost or quality of service available through the acknowledging node;

selecting by the originating node, at least one of the candidate relay nodes that acknowledged receiving the message, based upon the node-specific information;

transmitting a forwarding order from the originating node to the selected candidate relay node, said order instructing the selected node to forward the previously received message to a next node;

forwarding the message to the next node by the selected relay node; and transmitting an acknowledgment of the forwarding order from the selected candidate relay node to the originating node.

6. The method of claim 1, wherein the step of transmitting the message is performed as a broadcast.

7. The method of claim 1, wherein the step of transmitting the message is performed as a multicast.

8. The method of claim 1, wherein the step of transmitting the message is performed using Carrier Sense.

9. The method of claim 1, further comprising the step of discarding the message from non-selected candidate relay nodes after the step of transmitting the acknowledgment of the forwarding order.

10. The method of claim 1, wherein each message acknowledgment includes node-specific information related to cost or quality of service available through the acknowledging node.

11. The method of claim 1, further comprising the step of selecting transmit parameters prior to transmitting the message.

12. A method of forwarding information in a multi-hop network having a plurality of network nodes, said method comprising the steps of:

designating a network node as an originating node;

selecting a node in the network, different from the originating node, as a candidate relay node;

transmitting a message from the originating node to a plurality of other network nodes in a general direction in which the information is to be forwarded, wherein the plurality of other nodes includes the selected candidate relay node, and wherein the message includes a forwarding order directed to the selected candidate relay node;

in the event the selected candidate relay node receives the message, performing the steps of:

transmitting an acknowledgment of the message from the selected candidate relay node to the originating node;

designating the selected candidate relay node as the originating node; and repeating the steps of selecting a candidate relay node and transmitting the message;

in the event the originating node does not receive an acknowledgment of the message from the selected candidate relay node, performing the steps of:

transmitting an acknowledgment of the message to the originating node from each of the plurality of network nodes that successfully received the message from the originating node;

selecting one of the network nodes that acknowledged receiving the message as a new candidate relay node;

transmitting a forwarding order from the originating node to the newly selected candidate relay node;

transmitting an acknowledgment of the forwarding order from the newly selected candidate relay node to the originating node; and designating the newly selected candidate relay node as the originating node.

13. The method of claim 12, wherein the steps performed in the event the originating node does not receive an acknowledgment of the message from the selected candidate relay node, further comprise repeating the steps of selecting a candidate relay node and transmitting the message after designating the newly selected candidate relay node.

14. The method of claim 12, further comprising the step of transmitting an acknowledgment of the message to the originating node from each of the plurality of network nodes that successfully received the message from the originating node, in the event the selected candidate relay node receives the message.

15. A method of forwarding information in a multi-hop network having a plurality of network nodes, said method comprising the steps of:

selecting by an originating node in the network, a node in the network, different from the originating node, as a first candidate relay node;

transmitting a message from the originating node in the network to a plurality of candidate relay nodes in the network in a general direction in which the information is to be forwarded, wherein the plurality of candidate relay nodes includes the selected first candidate relay node, and wherein the message includes an order directing the selected first candidate relay node to select a second one of the plurality of candidate relay nodes to forward the message;

transmitting to the first selected candidate relay node, an acknowledgment of the message from each of the plurality of candidate relay nodes that received the message;

based on the transmitted acknowledgments of the message, selecting by the first selected candidate relay node, a second one of the candidate relay nodes to forward the message;

sending a forwarding order from the selected first candidate relay node to the selected second candidate relay node, said order instructing the selected second candidate relay node to forward the previously received message to a next node; and in response to the forwarding order, forwarding the message from the selected second candidate relay node to the next node.

16. The method of claim 15, wherein the step of forwarding the message from the selected second candidate relay node comprises:

designating the selected second candidate relay node as the originating node; and repeating the steps of selecting the first candidate relay node, transmitting the message, transmitting an acknowledgment of the message from each of the plurality of candidate relay nodes that received the message, selecting a second one of the candidate relay nodes to forward the message, and sending a forwarding order from the selected first candidate relay node to the selected second candidate relay node.

17. The method of claim 15, further comprising the step of sending an acknowledgment of the forwarding order, from at least one of the first and second selected candidate relay nodes, to the originating node.

18. The method of claim 17, further comprising the step of discarding the message from the originating node and non-selected ones of the plurality of candidate relay nodes after forwarding the message from the selected second candidate relay node.

19. The method of claim 17, wherein in the step of selecting a second one of the candidate relay nodes, the selected first candidate relay node is selected as the selected second candidate relay node.

20. The method of claim 17, further comprising, in the event the originating node does not receive an acknowledgment of the forwarding order, repeating the steps of selecting a first candidate relay node in the network, and transmitting the message from the originating node in the network to a plurality of candidate relay nodes.

21. A method of forwarding information in a multi-hop network having a plurality of network nodes, said method comprising the steps of:

transmitting multiple packets from an originating node in the network to a plurality of candidate relay nodes in the network in a general direction in which the information is to be forwarded;

transmitting an acknowledgment from each of the plurality of candidate relay nodes that received at least one of the multiple packets, to the originating node;

based on acknowledgments of the multiple packets received at the originating node, resending packets that were not received by at least a predetermined number of candidate relay nodes, until each packet has been received by at least the predetermined number of candidate relay nodes;

selecting at least one of the plurality of candidate relay nodes;

sending a forwarding order from the originating node, to each of the selected at least one candidate relay node; and in response to the forwarding order, forwarding received packets from each of the selected at least one candidate relay node.

22. A system for forwarding a message, comprising a plurality of nodes forming a network, wherein:

an originating node forwards the message to a plurality of candidate relay nodes in the network in a general direction in which the message is to be forwarded;

those of the plurality of candidate relay nodes that receive the message, transmit an acknowledgment to the originating node;

based on the acknowledgments, the originating node selects one of the candidate relay nodes that acknowledged receiving the message, and transmits a forwarding order to the selected candidate relay node instructing the selected candidate relay node to forward the previously received message to a next node; and the selected candidate relay node forwards the message to the next node, and transmits an acknowledgment of the forwarding order to the originating node.

23. A system for forwarding a message, comprising a plurality of nodes forming a network, wherein:

an originating node selects a candidate relay node in the network;

the originating node transmits a message to a plurality of candidate relay nodes in the network in a general direction in which the message is to be forwarded, wherein the plurality of candidate relay nodes includes the selected candidate relay node, and wherein the message includes a forwarding order directed to the selected candidate relay node;

in the event the selected candidate relay node receives the message, the selected candidate relay node transmits an acknowledgment of the message to the originating node, and forwards the message; and in the event the originating node does not receive an acknowledgment of the message from the selected candidate relay node, a) each of the at least one candidate relay node that successfully received the message from the originating node, transmits an acknowledgment of the message to the originating node, b) the originating node selects one of the at least one candidate relay nodes that acknowledged receiving the message and transmits a forwarding order to the newly selected candidate relay node, and d) the newly selected candidate relay node transmits an acknowledgment of the forwarding order to the originating node and forwards the message.

24. A system for forwarding a message, comprising a plurality of nodes forming a network, wherein:

an originating node selects a first candidate relay node in the network;

the originating node transmits a message to a plurality of candidate relay nodes in the network in a general direction in which the message is to be forwarded, wherein the plurality of candidate relay nodes includes the selected first candidate relay node, and wherein the message includes an order directing the selected first candidate relay node to select a second one of the plurality of candidate relay nodes to forward the message;

each of the plurality of candidate relay nodes that received the message, transmits an acknowledgment of the message to the first selected candidate relay node;

first selected candidate relay node selects a second one of the candidate relay nodes to forward the message, based on received acknowledgments of the message;

the first selected candidate relay node sends a forwarding order to the selected second candidate relay node; and selected second candidate relay node forwards the message in response to the forwarding order.

25. A system for forwarding data packets, comprising a plurality of nodes forming a network, wherein:

an originating node transmits multiple packets to a plurality of candidate relay nodes in the network in a general direction in which the packets are to be forwarded;

each of the plurality of candidate relay nodes that received at least one of the multiple packets, transmits an acknowledgment to the originating node;

the originating node determines which packets were not received by at least a predetermined number of candidate relay nodes, based on received acknowledgments of the multiple packets, and resends packets that were not received by at least a predetermined number of candidate relay nodes, until each packet has been received by the at least predetermined number of candidate relay nodes;

the originating node selects at least one of the plurality of candidate relay nodes based on the received acknowledgments;

the originating node sends a forwarding order to each of the selected at least one candidate relay node; and each of the selected at least one candidate relay node forwards packets it has received, in response to the forwarding order.

26. A method of forwarding data in a multi-hop network having a plurality of network nodes, said method comprising the steps of:

transmitting a probe message from an originating node to a plurality of candidate relay nodes in a general direction in which the data is to be forwarded;

transmitting an acknowledgment of the probe message to the originating node, from each of the candidate relay nodes that successfully received the message from the originating node;

based on acknowledgments of the probe message received by the originating node, selecting at least one of the candidate relay nodes that acknowledged receiving the probe message;

transmitting the data from the originating node to the selected candidate relay node;

upon successfully receiving the data, transmitting an acknowledgment of the data from the selected candidate relay node to the originating node; and designating the selected candidate relay node as a new originating node for further forwarding of the data.

27. The method of claim 26, further comprising the steps of:

determining whether an acknowledgment of the data is received by the originating node; and upon determining that the originating node did not receive an acknowledgment of the data, selecting a different one of the at least one candidate relay nodes.

28. The method of claim 26, further comprising the steps of:

determining whether an acknowledgment of the data is received by the originating node; and upon determining that the originating node did not receive an acknowledgment of the data, repeating the steps of claim 26.

29. The method of claim 26, further comprising the steps of:

determining whether an acknowledgment of the data is received by the originating node; and upon determining that the originating node did not receive an acknowledgment of the data, transmitting a message to request all nodes hearing the message to reply with an indication of whether the replying node received the data.

30. The method of claim 26, wherein:

the probe message is multicast and instructs all nodes hearing the probe message and not addressed in the probe message, to be silent for a time duration.

31. The method of claim 26, wherein:

the acknowledgment of the data from the selected candidate relay node instructs all nodes hearing the acknowledgment that are not the originating node, to be silent for a time duration.

32. The method of claim 26, wherein each acknowledgment message transmitted from each of the plurality of candidate relay nodes to the originating node includes node-specific information related to cost or quality of service available through the acknowledging node, and the step of selecting one of the candidate relay nodes includes selecting a candidate relay node based on the node-specific information in the transmitted acknowledgments of the message.

33. A communication node in a communication network, comprising:

means for communicating as an originating node in the network, comprising:

means for transmitting a message to a plurality of candidate relay nodes in the network in a general direction in which the information is to be forwarded;

means for receiving acknowledgments transmitted by those of the plurality of candidate relay nodes that received the message;

means for selecting one of the candidate relay nodes that acknowledged receiving the message, based on the acknowledgments; and means for transmitting a forwarding order to the selected candidate relay node; and means for communicating as a relay node in the network, comprising:

means for receiving a message from an originating node in the network;

means responsive to receiving the message, for transmitting an acknowledgment to the originating node;

means for receiving a forwarding order from the originating node, said forwarding order ordering the communication node to forward the received message in the general direction in which the information is to be forwarded; and means for forwarding the message.

34. A communication node in a communication network, comprising:

means for communicating as an originating node in the network, comprising:

means for selecting a candidate relay node in the network;

means for transmitting a message to a plurality of candidate relay nodes in the network in a general direction in which the information is to be forwarded, wherein the plurality of candidate relay nodes includes the selected candidate relay node, and wherein the message includes a forwarding order directed to the selected candidate relay node; and means for selecting one of the at least one candidate relay nodes that acknowledged receiving the message and transmitted a forwarding order to the newly selected candidate relay node, upon determining that the communication node did not receive an acknowledgment of the message from the selected candidate relay node; and means for communicating as a relay node in the network, comprising:

means for receiving a message that includes a forwarding order from an originating node in the network;

means for determining whether the forwarding order selects the communication node to forward the message;

means responsive to determining that the forwarding order selects the communication node, for transmitting an acknowledgment of the message to the originating node and forwarding the message;

means responsive to determining that the forwarding order does not select the communication node, for determining whether a candidate relay node in the network transmits an acknowledgment of the message to the originating node within a predetermined time period, and if not, transmitting an acknowledgment of the message to the originating node;

means for receiving a subsequent forwarding order from the originating node selecting the communication node; and means responsive to receiving the subsequent forwarding order, for transmitting an acknowledgment of the forwarding order to the originating node, and forwarding the message.

35. A communication node in a communication network, comprising:

means for communicating as an originating node in a network, comprising:

means for selecting a first candidate relay node in the network; and means for transmitting a message to a plurality of candidate relay nodes in the network in a general direction in which the information is to be forwarded, wherein the plurality of candidate relay nodes includes the selected first candidate relay node, and wherein the message includes an order directing the selected first candidate relay node to select a second one of the plurality of candidate relay nodes to forward the message; and means for communicating as a relay node in the network, comprising:

means for receiving a message that includes an order from an originating node;

means for determining whether the order in the message selects the communication node as the first selected candidate relay node;

means responsive to determining that the order does not select the communication node as the first selected candidate relay node, for transmitting an acknowledgment of the message to the first selected candidate relay node;

means responsive to determining that the order in the message selects the communication node as the first selected candidate relay node, for selecting a second one of the candidate relay nodes to forward the message, based on received acknowledgments of the message from candidate relay nodes in the network;

means for sending a forwarding order to the selected second candidate relay node; and means responsive to receiving a forwarding order from the selected first candidate relay node, after receiving and acknowledging the message, for forwarding the message.

36. A communication node in a communication network, comprising:

means for communicating as an originating node in a network, comprising:

means for transmitting multiple packets to a plurality of candidate relay nodes in a general direction in which the information is to be forwarded;

means for receiving any acknowledgments of the transmitted packets from the plurality of candidate relay nodes;

means for determining which packets were not received by at least a predetermined number of candidate relay nodes, based on received acknowledgments of the multiple packets;

means for resending packets that were not received by at least a predetermined number of candidate relay nodes, until each packet has been received by the at least predetermined number of candidate relay nodes;

means for selecting at least one of the plurality of candidate relay nodes based on the received acknowledgments; and means for sending a forwarding order to each of the selected at least one candidate relay nodes; and means for communicating as a relay node in the network, comprising:

means for receiving one or more multiple packets from an originating node in the network;

means for transmitting an acknowledgment to the originating node confirming receipt of the received packets;

means for receiving a forwarding order instructing the communication node to forward received packets; and means for forwarding the received packets.

37. The method of claim 15, wherein each acknowledgment message transmitted from each of the plurality of candidate relay nodes to the first selected candidate relay node includes node-specific information related to cost or quality of service available through the acknowledging node, and the step of selecting a second one of the candidate relay nodes to forward the message includes selecting the second candidate relay node based on the node-specific information in the transmitted acknowledgments of the message.

38. The system of claim 22, wherein each acknowledgment message transmitted from each of the plurality of candidate relay nodes to the originating node includes node-specific information related to cost or quality of service available through the acknowledging node, and the originating node selects one of the candidate relay nodes based on the node-specific information in the transmitted acknowledgments of the message.

* * * * *

UNITED STATES PATENT AND TRADEMARK OFFICE
CERTIFICATE OF CORRECTION

PATENT NO.       : 6,798,765 B2
APPLICATION NO.  : 09/970023
DATED            : September 28, 2004
INVENTOR(S)      : Larsson Page 1 of 1

It is certified that error appears in the above-identified patent and that said Letters Patent is hereby corrected as shown below:

In Column 26, Line 17, in Claim 36, after "nodes" insert -- in the network --.

Signed and Sealed this

Second Day of September, 2008

JON W. DUDAS
*Director of the United States Patent and Trademark Office*